L. B. SHEPARD.
SIGHT FOR FIREARMS.
APPLICATION FILED NOV. 27, 1908.
944,916.
Patented Dec. 28, 1909.
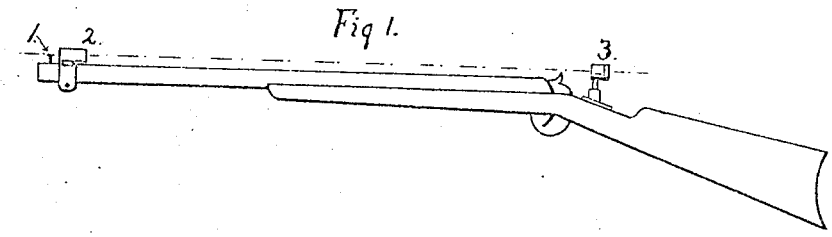
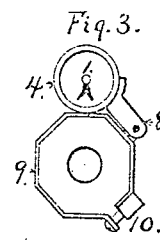 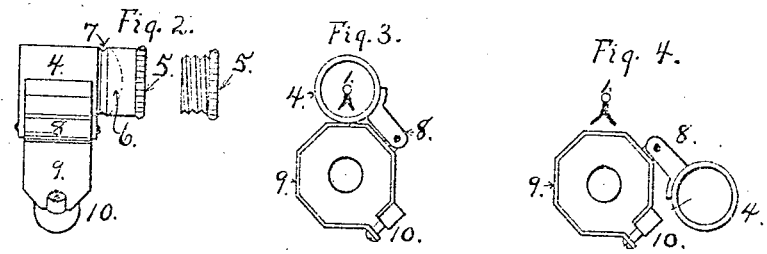 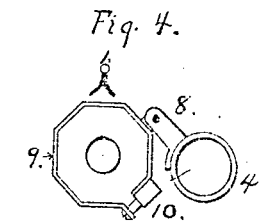
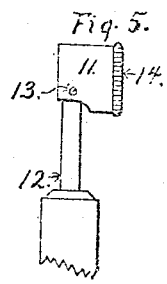 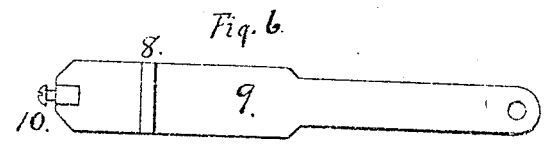
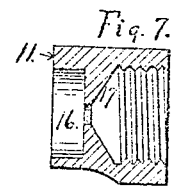 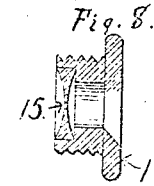 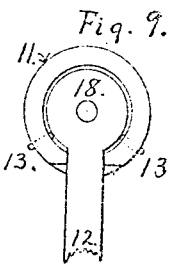
Witnesses.
Charles C. Inskeep.
Coy A. Pettis.
Inventor.
Louis B. Shepard

UNITED STATES PATENT OFFICE.

LOUIS B. SHEPARD, OF CEDAR RAPIDS, IOWA, ASSIGNOR TO C. CHAMBERS INSKEEP CO., OF CEDAR RAPIDS, IOWA, A CORPORATION.

SIGHT FOR FIREARMS.

944,916.

Specification of Letters Patent. Patented Dec. 28, 1909.

Application filed November 27, 1903. Serial No. 464,632.

*To all whom it may concern:*

Be it known that I, LOUIS B. SHEPARD, a citizen of the United States, and a resident of Cedar Rapids, in the county of Linn and the State of Iowa, have invented certain new and useful Improvements in Sights for Firearms, of which the following is a specification.

My invention relates to sights for fire arms, and particularly to that class of sights in which lenses are used to magnify or make more distinct, the object aimed at.

The object of my invention is to provide a lens sight combination that can be easily and securely attached to a gun or its parts without injuring, or in any way marring the gun or its parts, and also to provide a means by which the lenses in said lens sight, may be quickly and conveniently removed from the line of sight.

In the accompanying drawings, to which reference is made, and which form part of this specification, Figure 1 is a side elevation of a rifle having my invention applied thereto. Fig. 2, is a side elevation of a front lens tube and hinge and band. Fig. 3, is a front elevation of the front lens tube and hinge and band. The lens tube being in position for sighting through the lens. Fig. 4, is given to show the position of the front tube turned to the side, out of line of sight, when it is desired to sight without the lens. Fig. 5, is a side elevation of the rear lens attachment, secured to a disk on the stem of a peep sight. Fig. 6, is a top view of the metal band or strap unbent, to which is attached the front lens tube, or holder, and hinge. Fig. 7, is an enlarged longitudinal section of the rear lens tube. Fig. 8, is an enlarged longitudinal section of the rear sight lens cell. Fig. 9, is an enlarged front elevation of the rear lens sight.

Similar figures refer to similar parts throughout the several views.

In the arrangement shown in Fig. 1, 1 designates the front sight; 2, front lens attachment, and 3, the rear lens attachment secured to the stem of a peep sight at the rear.

In Fig. 2, 4 is a metal tube containing a convex lens 6, (shown by dotted lines) held in place by the screw tube, 5, against an interior annular rib, 7, said tube 4, is secured to a suitable hinge, 8; said hinge 8, being also secured to band 9. The band 9, is preferably made of thin pliable metal, so that it can be easily shaped to fit around any form of gun barrel, and is provided with a binding screw, 10, at its terminals as a means of securing it to the gun barrel.

In Figs. 3 and 4, the purpose of the hinge, 8, and the binding screw, 10, are clearly shown, while 1, simply shows the ordinary bead sight as it appears on the gun muzzle.

As shown in Fig. 7, 11, is a tube with a recess, 16, milled at one end into which is secured the peep disk, 18, against the interior annular rib, 17, by one or more set screws. The tube 11, is threaded at the other end to receive the lens cell, 14, which contains a concave lens, 15, shown in Fig. 8.

Fig. 9, shows the disk, 18, secured into the tube, 11, by the set screws, 13.

It is seen by these specifications, that with my invention one may quickly and easily remove the lenses from the line of sight by unscrewing the lens cell, 14, from the tube, 11, and turning aside the lens tube, 4, on the hinge, 8, as shown in Fig. 4.

I am aware that lenses have been used in connection with gun sights heretofore, and the optical properties of such lenses have been described in text books for many years, therefore I do not claim such a combination.

Having thus described my invention, what I claim as new, and desire to secure by Letters Patent, is—

A lens sight for firearms consisting of a tube, containing a lens; a means for holding a lens in said tube; a movable support for said tube comprising a hinge and a pliable band which is attached to the barrel of the gun near the muzzle; in combination with a short lens tube, containing a lens, and a means of attaching same to a peep sight at the rear, substantially as shown and described.

LOUIS B. SHEPARD.

Witnesses:
  COY A. PETTIS,
  CHARLES C. INSKEEP.